(12) United States Patent
Campian

(10) Patent No.: US 8,202,388 B2
(45) Date of Patent: Jun. 19, 2012

(54) APPARATUS AND METHOD FOR HOLDING MATERIALS FOR THE FORMING AND JOINING THEREOF

(75) Inventor: Jonathon Reo Campian, City Troy, MI (US)

(73) Assignee: Modern Body Engineering Corporation, Madison Heights, MI (US)

( * ) Notice: Subject to any disclaimer, the term of this patent is extended or adjusted under 35 U.S.C. 154(b) by 1119 days.

(21) Appl. No.: 10/521,652

(22) PCT Filed: Oct. 15, 2004

(86) PCT No.: PCT/US2004/034238
§ 371 (c)(1),
(2), (4) Date: Jan. 14, 2005

(87) PCT Pub. No.: WO2005/037517
PCT Pub. Date: Apr. 28, 2005

(65) Prior Publication Data
US 2006/0081331 A1     Apr. 20, 2006

(51) Int. Cl.
*B32B 37/00* (2006.01)
(52) U.S. Cl. ........ 156/212; 156/285; 156/538; 156/556; 269/21

(58) Field of Classification Search .................. 156/212, 156/242, 245, 391, 497, 500, 538, 539, 556, 156/285; 264/320, 511, 553; 269/21
See application file for complete search history.

(56) References Cited

U.S. PATENT DOCUMENTS

| | | | |
|---|---|---|---|
| 4,769,100 A | 9/1988 | Short et al. | 156/285 |
| 4,802,948 A | 2/1989 | Zimmermann et al. | 156/500 |
| 5,076,880 A | 12/1991 | Spengler et al. | 156/382 |
| 5,228,190 A * | 7/1993 | Sawa | 29/715 |
| 5,375,951 A * | 12/1994 | Veale | 409/131 |
| 5,554,252 A * | 9/1996 | Foran | 156/497 |
| 5,695,865 A | 12/1997 | Shimizu | 428/212 |
| 5,741,386 A | 4/1998 | Tomioka et al. | 156/212 |
| 5,800,661 A * | 9/1998 | Reis et al. | 156/285 |
| 5,925,207 A | 7/1999 | Itoh et al. | 156/216 |

* cited by examiner

Primary Examiner — James Sells
(74) Attorney, Agent, or Firm — Harness, Dickey & Pierce, P.L.C.

(57) ABSTRACT

A machine cell for the forming and joining of a first sheet material to a second sheet material includes an upper gate and a lower nest. The lower nest includes a vacuum pad having a recessed channel defined therein. A vacuum system is fluidly connected to the recessed channel to hold the first sheet material to the lower nest during the joining of the first and second sheet materials. The machine cell further includes an arrangement for aligning the first sheet material to the second sheet material.

34 Claims, 3 Drawing Sheets

APPARATUS AND METHOD FOR HOLDING MATERIALS FOR THE FORMING AND JOINING THEREOF

FIELD OF THE INVENTION

The present invention relates to systems for holding and aligning a first sheet material and a second sheet material for the joining thereof. More particularly, the present invention relates to a method and apparatus for holding a first sheet material and a second sheet material that utilizes a vacuum arrangement for holding the first sheet material in place during the alignment of the second sheet material thereto and during the joining of the first sheet material to the second sheet material.

DESCRIPTION OF THE RELEVANT ART

One of the earliest operations required in the history of automobile assembly was the joining of an inner panel to an outer panel to form any of a variety of body parts, including doors, engine hoods, fuel tank doors and trunk lids, all referred to as "swing panels" which encase the vehicle frame. Known machines for the forming and joining of sheet materials include the press-and-die set, the tabletop and the roller-forming tool, the latter being the most-recently introduced device.

An unfortunate feature of joining materials is that the sheets tend to become misaligned with each other before or during the joining operation. Certain efforts have been undertaken to overcome this problem.

One known effort employed to prevent the skidding of one sheet relative to the other has been to apply an upper pressure ring from above the sheet materials, thereby pinching the upper and lower sheets between the upper pressure ring and the lower nest member. This practice leads to the consumption of much of the workspace above the sheet materials. In addition, the use of the upper pressure ring requires a high-powered overhead device to effect operation. All considered, the use of the upper pressure ring is costly and inconvenient.

An additional known practice to prevent skidding of two sheets during joining is to align the two sheets relative to one another from the side using side gauges. This operation, while offering certain advantages over the use of the upper pressure ring in terms of cost, space and equipment, does a poor job of controlling movement of the sheet materials. The use of gauges also leads to defacing of the sheet material through scratching during loading and unloading of the sheet material. Importantly, during operation, the gauges interfere with the travel of the forming tool. In some instances, if the gauges are spring-loaded, the rolling tool may be shocked and may suffer a pressure bounce when struck.

An additional practice has been to simply position one sheet above the other without holding, this latter approach clearly being the least desirable.

Accordingly, prior approaches to solving the problem of providing a method and apparatus for forming and joining two sheet materials together while restricting movement of the sheets relative to one another have failed to overcome the problem.

SUMMARY OF THE PRESENT INVENTION

It is thus the general object of the present invention to provide a method and apparatus that overcomes the problems of known techniques for forming and joining a first sheet material to a second sheet material to create a swing panel for an automobile.

It is a particular object of the present invention to provide a machine cell for forming and joining a first sheet material to a second sheet material which provides a definite method for aligning and securing a first panel to the lower nest and for aligning and securing the second panel to the first panel.

A further object of the present invention is to provide such a machine cell which utilizes an array of crowders to align the first panel on the lower nest.

Yet another object of the present invention is to provide such a machine cell which utilizes a vacuum system to securely hold the first panel to the lower nest.

Still a further object of the present invention is to provide such a machine cell which utilizes an upper gate for aligning and holding the second panel relative to the first panel.

Another object of the present invention is to provide such a machine cell which is efficient, cost-effective, and flexible enough to accommodate panels of various sizes, shapes, and contours.

These and other objectives are achieved by the provision of a machine cell which includes an upper gate and a lower nest. The lower nest includes an upper surface which has at least one channel defined in the upper surface. A vacuum source is fluidly connected to the channel(s).

A pair of married sheet materials A, B are approximated onto the lower nest. The first sheet material A is then precision positioned by means of crowders. The upper gate thereafter aligns the second sheet material B with respect to the first sheet material A by alignment pins. The first sheet material A is held in place by a vacuum applied to its under side by way of the channel. Thus held in place, a forming operation may be effected for joining the first sheet material A to the second sheet material B.

These and other objectives are accomplished by the provision of a machine cell for forming and aligning a first sheet material to a second sheet material as set forth hereinafter.

BRIEF DESCRIPTION OF THE DRAWINGS

The present invention will be more fully understood by reference to the following detailed description of the preferred embodiments when read in conjunction with the accompanying drawings, in which like reference characters refer to like parts throughout the views, and in which.

DETAILED DESCRIPTION OF A PREFERRED EMBODIMENT OF THE PRESENT INVENTION

The drawings disclose the preferred embodiment of the present invention. While the configurations according to the illustrated embodiment are preferred, it is envisioned that alternate configurations of the present invention may be adopted without deviating from the invention as portrayed. The preferred embodiment is discussed hereafter.

Figure 1:
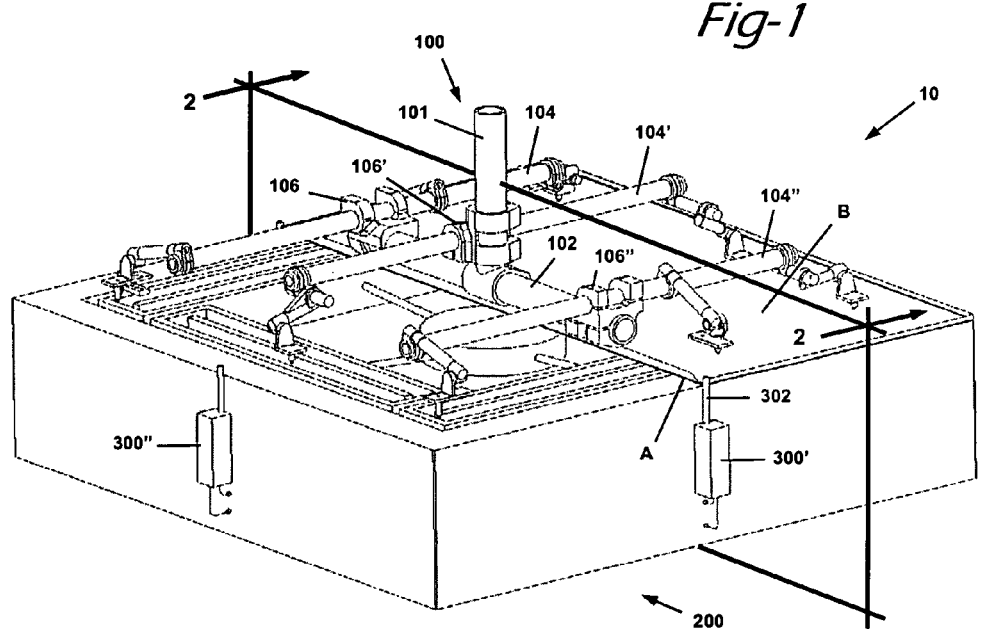
FIG. 1 is a perspective view of the preferred embodiment of the present invention.

With reference first to FIG. 1, the preferred embodiment of a machine cell, generally referred to as 10, is illustrated in a perspective view. The machine cell 10 includes an upper gate 100 and a lower nest 200. It should be understood that the configuration of the machine cell 10 as illustrated is preferred, but is not to be interpreted as limiting as other configurations conceivable to those skilled in the art may also be suitable.

Figure 5:
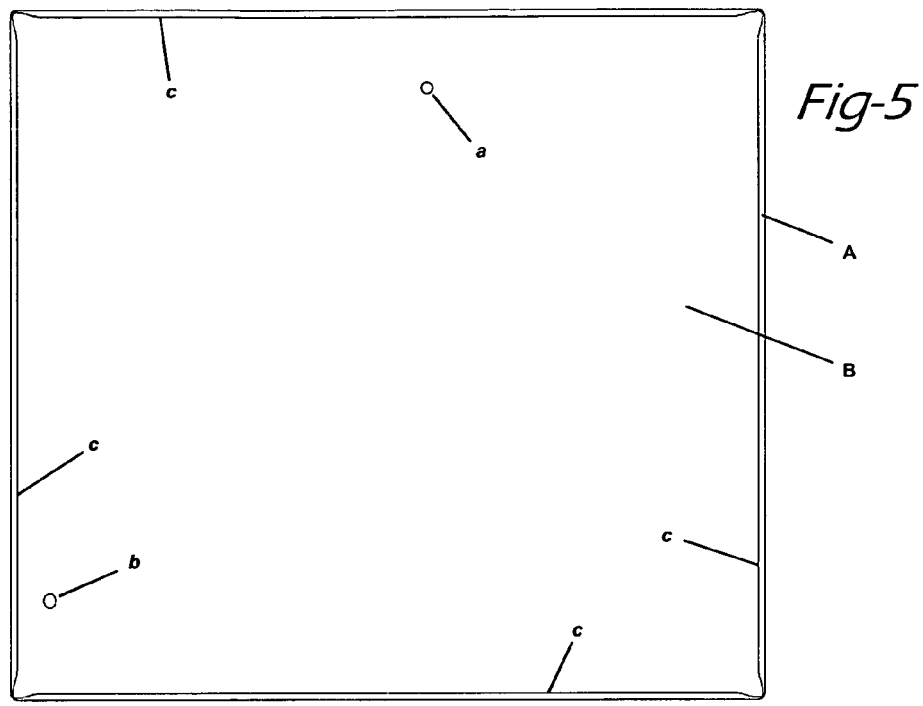
FIG. 5 is a top plan view substantially illustrating a sample inner sheet material or the support structure that forms the inner part of the resulting joined component.

The present invention serves to hold two portions of sheet material so that a joining process may be undertaken without the sheet material portions being caused to shift or otherwise move out of position. The two portions of sheet material include a first sheet material A and a second sheet material B. The two sheets A and B, in a combination resulting from joining and forming becomes an integrated component, of which the first sheet material A is the outer part or the skin and the second sheet material B is the inner part or the support structure. (This latter material is illustrated, by way of example, in FIG. 5, discussed below.) As illustrated, the first sheet material A and the second sheet material B have a generally square configuration resulting in a generally square-shaped integrated component. However, it is to be understood that other shapes may be suitable for use in the present invention.

In brief, the married sheet materials A, B are approximated onto the lower nest 200. The first sheet material A is then precision positioned by means of crowders, which will be discussed below primarily in relation to FIG. 1. Thereafter the upper gate 100 aligns the second sheet material B with respect to the first sheet material A by alignment pins as will be discussed below primarily in relation to FIG. 3. The first sheet material A is held in place by a vacuum applied to its under side. Thus held in place, a forming and joining operation may be effected for clinching the first sheet material A to the second sheet material B.

Figure 2:
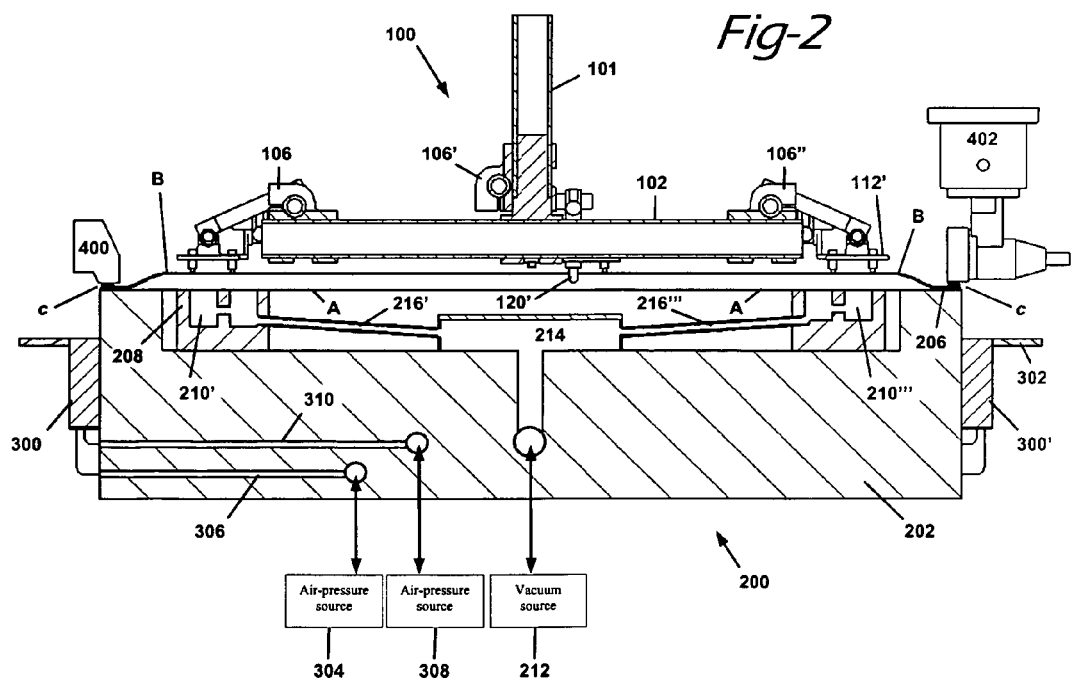
FIG. 2 is a sectional view taken along lines 2-2 of FIG. 1.
Figure 3:
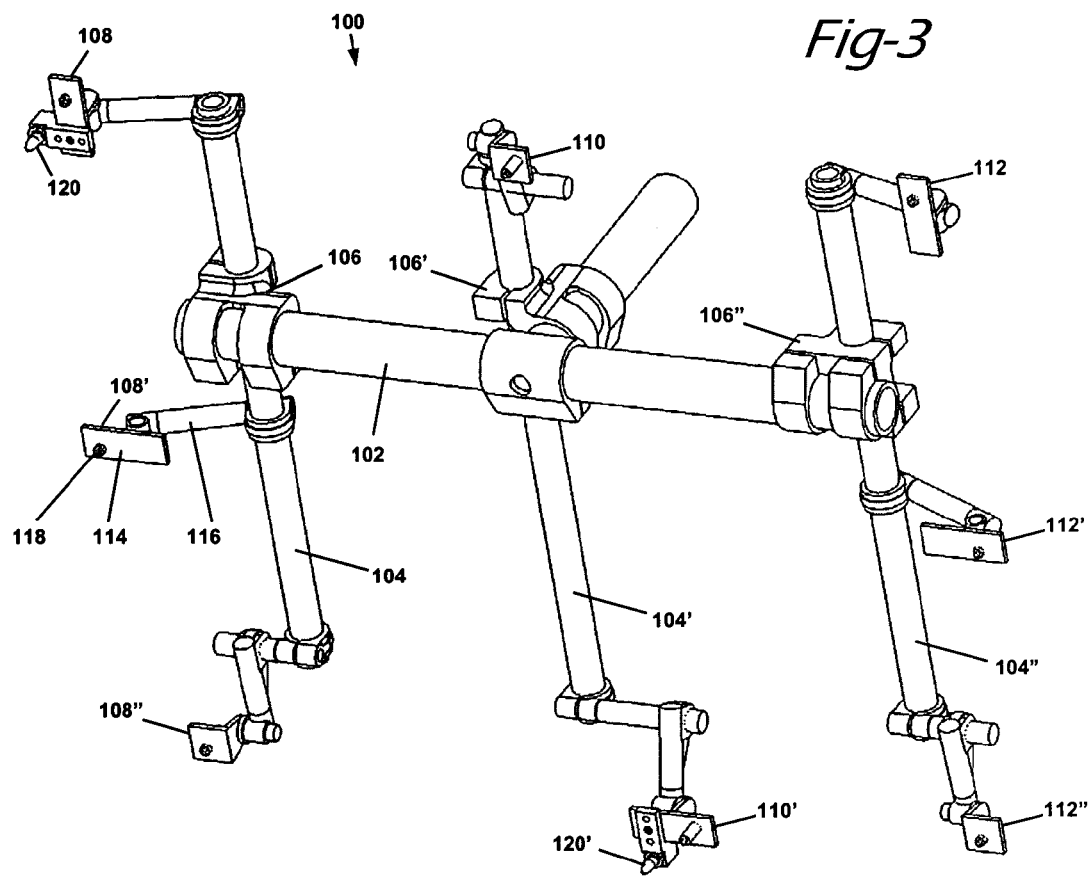
FIG. 3 is a perspective view of the upper gate of the present invention.

The upper gate 100 is shown in perspective view in relation to the entire machine cell 10 in FIG. 1, in sectional view in FIG. 2, and by itself in perspective view in FIG. 3. As illustrated in these figures, the upper gate 100 includes a main shaft 102 that is attached to a robotic arm or linear slide attachment shaft 101. The main shaft 102 is fixed in a substantially perpendicular position with respect to the robotic arm attachment shaft 101.

Pivotally attached to the main shaft 102 are three substantially parallel contact plunger support shafts 104, 104', 104". Each of the plunger support shafts 104, 104', 104" is attached to the main shaft 102 by a lockable swivel joint illustrated as lockable swivel joints 106, 106', 106". The lockable swivel joints 106, 106', 106" allow the support shafts 104, 104', 104" to be rotated with respect to the main shaft 102 thereby accommodating a variety of panels of different sizes and shapes. The composition of the shafts 102, 104, 104', 104" may be from a range of materials, including steel or aluminum.

Each of the plunger support shafts 104, 104', 104" preferably includes at least two contact plunger assemblies for firmly urging the second sheet material B against the first sheet material A. Specifically, contact plunger assemblies 108, 108', 108" are rotatably attached to the plunger support shaft 104, plunger assemblies 110, 110' are rotatably attached to the plunger support shaft 104', and plunger assemblies 112, 112', 112" are rotatably attached to the plunger support shaft 104".

Figure 4:
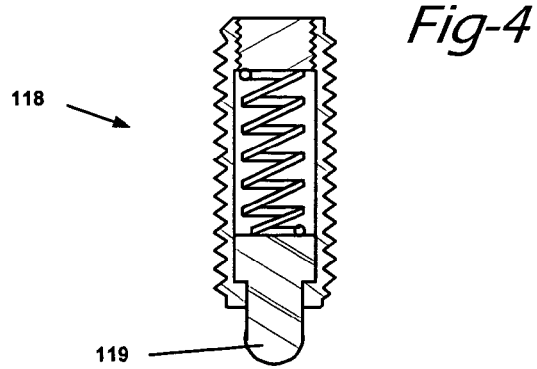
FIG. 4 is a sectional view of a spring plunger according to the present invention.

Each of the contact plunger assemblies 108 . . . 108", 110, 110', 112 . . . 112" includes a plunger body and an attachment shaft. Using plunger assembly 108' as an example and as illustrated in FIG. 4, a plunger body 114 is pivotally attached to a plunger attachment shaft 116, with the shaft 116 being rigidly fitted to the rotatable plunger support shaft 104. It should be noted that while in operation the rotatable plunger support shaft 104 is locked to the swivel joint 106. However, prior to operation, the swivel joint 106 may be loosened and the rotatable shaft 104 may be rotatably adjusted as needed to provide precise support for the second sheet material B.

Referring to FIG. 4, in addition to the plunger body 114, the plunger assembly 108' includes a plunger unit 118 which is preferably thread-fitted into the plunger body 114 thus allowing adjustability with respect to the plunger body 114. To safely yet firmly urge the second sheet material B against the first sheet material A, each plunger unit 118 includes a spring-loaded nose 119. The nose 119 may be made of a variety of materials, but is preferably made from a hard, non-marring material such as nylon. The plunger unit 118 could be of the type available from the Vlier Company of Brighton, Mass.

In addition to the function of applying pressure to urge the second sheet material B against the first sheet material A, the upper gate 100 also preferably provides an alignment function to align the second sheet material B with respect to the first sheet material A. The alignment function is accomplished by alignment pins acting in conjunction with circular and elongated alignment holes defined in the sheet material (in this case, sheet material B), which defines the inner part or the support structure of the resulting joined component. As illustrated in FIG. 3, certain ones of the plunger assemblies include alignment pins for engagement with the circular and elongated alignment holes of sheet material B. According to the preferred embodiment, the plunger assemblies 108 and 110' each include alignment pins 120, 120' respectively. The alignment pins 120, 120' include generally conical or pointed ends and function to engage alignment holes a and b shown in the sample second sheet material B illustrated in FIG. 5. It should be understood to one skilled in the art that the placement and number of alignment holes may be varied according to need.

Figure 6:
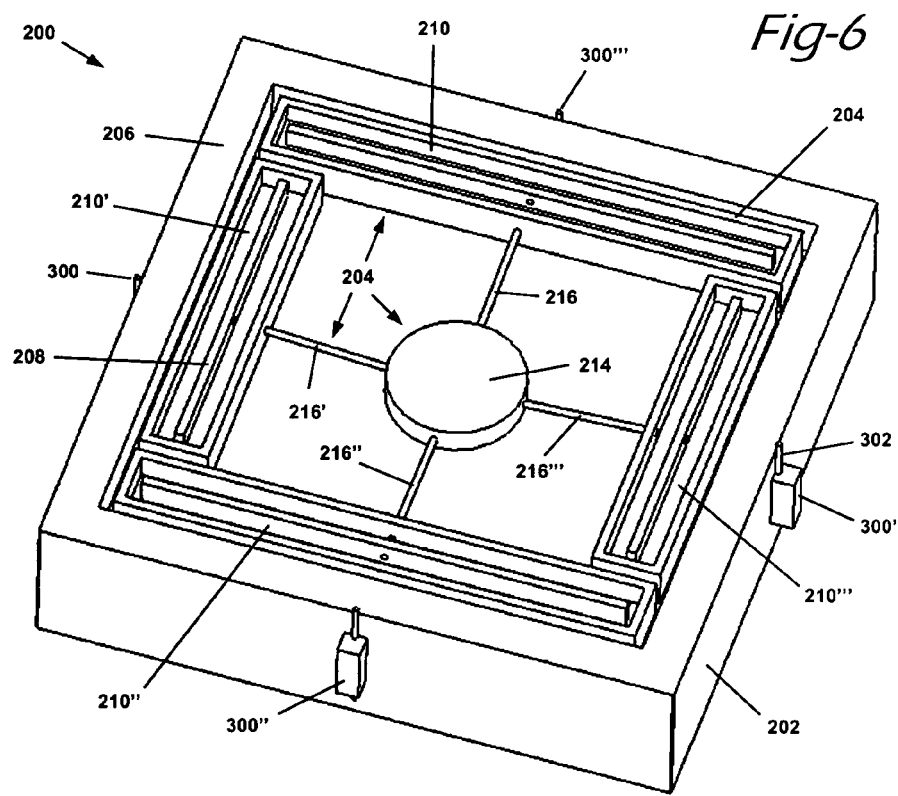
FIG. 6 is a perspective view substantially illustrating the top of the lower nest member.

The lower nest 200 is partially illustrated in perspective view in FIG. 1 in conjunction with the upper gate 100, is illustrated in sectional view in FIG. 2 as taken along lines 2-2 of FIG. 1, and is shown in perspective view in FIG. 6 without the upper gate 100, or sheet materials A and B.

Referring then to FIGS. 1, 2 and 6, the lower nest 200 generally includes a frame 202 and a vacuum assembly 204. The frame 202, also known as an anvil, is configured so as to provide maximum support to the vacuum assembly 204, thus any one of a variety of configurations suitable for providing needed support may be adapted as known to one skilled in the art. The configuration shown is for illustrative purposes only. The frame 202 may be made from a variety of rigid materials, ranging from hard polymers to steel. The frame 202 includes an upper surface area 206 which provides support during the forming operation of the first sheet material A with the second sheet material B as is known in the art and as discussed further below with respect to the operation of the machine cell 10.

The vacuum assembly 204 includes one or more vacuum pads 208. Each of the vacuum pads 208 includes a series of vacuum channels 210, 210', 210", 210'". This preferred arrangement allows for the appropriate degree of vacuum to be applied to the first sheet material A when positioned on the vacuum pads 208. While it is possible that other arrangements may be applied, such as a series of vacuum holes formed in a substantially solid nest surface or a series of vacuum cups, the illustrated arrangement of the vacuum channels 210, 210', 210", 210'" is preferred. Each of the vacuum pads 208 has an upper surface that is shaped to the contour of the first sheet material A.

Each vacuum pad 208 has a dual purpose—first, to provide a substantially air-tight seal with respect to the first sheet material A and, second, to provide a cushioned surface support for carefully supporting the first sheet material A while preventing its deformation. Accordingly, it is preferred that the vacuum pads 208 be composed of an elastic or semi-elastic polymerized material suitable for these purposes.

In addition to the vacuum pads 208, the vacuum assembly 204 includes necessary elements appropriate to the creation of a working vacuum within the channels 210, 210', 210", 210'". FIG. 2 illustrates the preferred arrangement of vacuum lines for operation of the machine cell 10. A vacuum source, generally illustrated as 212, is provided and can be any one of such known sources. The source 212 is fluidly connected to a centrally located plenum 214. A series of vacuum lines 216, 216', 216", 216'", respectively fluidly connect the plenum 214 with the vacuum channels 210, 210', 210", 210'".

Alignment of the second sheet material B with respect to the upper gate 100 is discussed above and is accomplished by use of alignment pins and alignment holes. Alignment of the first sheet material A with respect to the lower nest 200 may also be accomplished. To make the preferred alignment, two or more crowder assemblies 300, 300', 300", 300'" are provided on the lower nest 200 to correctly align the sheet material A. Each of the crowder assemblies 300, 300', 300", 300'" includes a movable alignment finger to effect alignment. Using the crowder assembly 300' as an example, a finger 302 is pivotally provided and is movable between a substantially vertical aligning position, as shown in FIGS. 1 and 4 and a substantially horizontal disengaged position, as shown in FIG. 2.

The crowder assemblies 300, 300', 300", 300'" are pneumatically operated and are each fluidly connected to two pressure sources, one for moving the finger into its substantially vertical aligning position and one for moving the finger into its disengaged position. By way of example, the crowder assembly 300 is fluidly connected to a first air pressure source 304 by a fluid line 306 which operates to hold the finger in its disengaged position. A second air pressure source 308 is connected to the crowder assembly 300 by a fluid line 310 which operates to hold the finger in its aligning position.

Forming and joining of the first sheet material A with the second sheet material B is accomplished by a known forming unit. As illustrated in FIG. 2, a die/tabletop steel-type-forming unit 400 may be used. Alternatively, or in addition, a roller-tool type of forming unit 402 may accomplish the operation of forming and joining. Detail as to the configurations of the forming units 400, 402 will be omitted as such is well known to those skilled in the art.

Operation

The operation of the machine cell 10 will now be generally described. As the operation begins the upper gate 100 should already be in its elevated position, assuming that a joining operation has already been completed and the joined part has been removed, thus leaving the lower nest 200 empty.

Initially a known quantity of mastic is applied to the approximate surface areas at which the first sheet material A will be joined to the second sheet material B. The mastic is utilized to provide a more complete joining of the sheet materials. The mastic may be joined to one of the sheets or to both as may be desired. Known mastics may include glass bead-filled compositions as are known in the art.

The machine cell 10 may then be operated by a human operator or by a programmable logic controller as is known in the art. Regardless of the form of the operator, reference shall be made hereafter generically to "the operator."

Once the mastic has been selectively applied to the sheets A and B, the operator marries the first sheet material A to the second sheet material B then places the combined sheets on the vacuum pads 208 with the first sheet material A face down (that is, the outer surface of the sheet material A is placed onto the vacuum pads 208). The crowder assemblies 300, 300', 300", 300'" are then activated by operation of the second air pressure source 308 to advance the alignment fingers to their engaged and aligning positions. So engaged, the first sheet metal A is in alignment relative to the lower nest 200. This arrangement facilitates positive micro positioning of the first sheet material A.

The operator then engages the robotic arm or linear slide (neither shown) to lower the upper gate 100 into an engaged position. The robotic control provides that movement of the upper gate 100 with a precise attitude. As the upper gate 100 is lowered, the alignment pins 120, 120' having generally conical or pointed tips as illustrated in FIG. 3 engage the circular and elongated alignment holes a and b of the sheet material B. The pointed configurations of the alignment pins allow for some degree of initial play with the fit becoming tighter as the upper gate 100 is lowered. Accordingly, as the upper gate 100 is lowered, the pins 120, 120' effect alignment by their engagement with the alignment holes a and b.

As the upper gate 100 is lowered and the alignment pins 120, 120' engage the alignment holes a and b, the second sheet material B is moved into alignment with the first sheet material A. The polymerized noses of the contact plunger assemblies 108 . . . 108", 110, 110', 112 . . . 112" apply a light pressure about the periphery of the second sheet material B, thus ensuring that the first sheet material A is nested onto the vacuum pads 208.

After the first sheet material A and the second sheet material B are in position, the vacuum source 212 is activated to provide a vacuum between the surface of the first sheet material A and the vacuum channels 210, 210', 210", 210'". The first sheet material A is thus immobilized. With the combined assembly of the first sheet material A and the second sheet material B secured within the machine cell 10, the first air pressure source 304 is activated and the fingers of the crowder assemblies 300, 300', 300", 300'", 300'" are drawn away from their aligning positions to the substantially horizontal positions illustrated in FIG. 2. Thus positioned, the fingers will not interfere with the subsequent forming operation.

The joining operation then occurs, by which the upstanding flanges of material A are formed over onto material B resulting in clinched formation c. Formation c thus resides around part of or the entire periphery of the joined first sheet material A and the second sheet material B. As noted above, joining of the first sheet material A with the second sheet material B is accomplished by either the die/tabletop steel-type-forming unit 400 or the roller-tool-type-forming unit 402. Regardless of the chosen forming unit, the surface 206 of the frame 202 provides a rigid surface upon which forming operations may take place.

Once forming and joining of the first sheet material A to the second sheet material B is complete, the upper gate 100 is removed from the second sheet material B and the vacuum source 212 is de-energized causing the first sheet material A to be re-mobilized from the vacuum pads 208. The joined sheet materials A and B are unloaded from the top of the vacuum pads 208 and the next pair of married sheet materials A and B. is loaded. The forming and joining operation is thus repeated.

Those skilled in the art can now appreciate from the foregoing description that the broad teachings of the present invention can be implemented in a variety of forms. Therefore, while this invention has been described in connection with the particular examples thereof, the true scope of the invention should not be so limited since other modifications will become apparent to the skilled practitioner upon a study of the drawings, specification and following claims.

What is claimed is:

1. A machine cell for forming a body panel by joining of a first metal panel to a second metal panel, the machine cell comprising:
a lower nest including a frame and an upper surface defined to substantially conform to a perimeter region of the first metal panel, the upper surface having a generally flat material-contacting area extending to a boundary of the upper surface to enable unobstructed lateral movement of a forming tool from the material-contacting area across the boundary;
a vacuum pad supported by said frame adjacent to a portion of said material-contacting portion, said vacuum pad having a sealing surface defined to substantially conform to an interior region of the first metal sheet and an elongated channel formed therein;
a vacuum system to enable fluid communication between a vacuum source and said elongated channel for selectively evacuating said elongated channel;
wherein said vacuum pad and said vacuum system are operable to generate a downward clamping force sufficient to laterally immobilize the first metal sheet during an operation clinching together the first metal panel and the second metal panel.

2. The machine cell of claim 1, further including an upper gate for holding the second metal panel, said upper gate movable between a raised position away from said lower nest and an engaged position near said lower nest with said lateral access to said material-contacting area being maintained.

3. The machine cell of claim 1, wherein said vacuum system further includes a plenum and at least one fluid line connecting said plenum to said elongated channel.

4. The machine cell of claim 3, wherein said vacuum system further includes a fluid line for fluidly connecting said plenum to a vacuum source.

5. The machine cell of claim 1, wherein said lower nest further includes an alignment mechanism for aligning the first metal panel to the nest periphery.

6. The machine cell of claim 5, wherein said alignment mechanism further comprises a pair of crowders, each of said pair of crowders including a pivoting alignment finger.

7. The machine cell of claim 2, further including means for moving said upper gate relative to said lower nest.

8. The machine cell of claim 2, wherein said upper gate includes at least one contact support shaft.

9. The machine cell of claim 2, wherein said upper gate includes three spaced-apart contact support shafts.

10. The machine cell of claim 8, wherein said at least one contact support shaft includes a contact plunger for contacting the second metal panel.

11. The machine cell of claim 10, wherein said contact plunger includes a spring-loaded nose.

12. The machine cell of claim 8, wherein said at least one contact plunger support shaft includes an alignment pin capable of engaging an alignment hole formed in the second sheet material.

13. A machine cell for forming a body panel by joining of a first metal panel to a second metal panel by a forming tool, the machine cell comprising:
a lower nest including a frame and an upper surface defined to substantially conform to a perimeter region of the first metal panel, the upper surface having a generally flat material-contacting area extending to a boundary of the upper surface to enable unobstructed lateral movement of the forming tool from the material-contacting area across the boundary;
a plurality of pads supported by said frame, each of said plurality of pads located adjacent to a portion of said material-contacting portion and having a sealing surface defined to substantially conform to an interior region of the first metal panel and an elongated channel formed therein;
a vacuum system to enable fluid communication between a vacuum source and said elongated channel for selectively evacuating said elongated channel;
wherein said plurality of pads and said vacuum system are operable to generate a downward clamping force sufficient to laterally immobilize the first metal sheet during an operation clinching together the first metal panel and the second metal panel.

14. The machine cell of claim 13, wherein said elongated channel is disposed within said frame.

15. The machine cell of claim 13, further including at least one alignment mechanism fitted to said frame.

16. The machine cell of claim 13, further including a central support disposed within said elongated cavity.

17. The machine cell of claim 13, wherein said frame further comprises a second material contacting surface offset from said first material contacting surface relative to said base.

18. The machine cell of claim 13, further including a forming tool, said forming tool being operative to effect forming of at least one of the first sheet material or the second sheet material.

19. The machine cell of claim 1 wherein said vacuum pad further comprising a support member disposed within said elongated channel and having a sealing surface defined to substantially conform to an interior region of the first sheet material.

20. The machine cell of claim 13 further including an upper gate for holding the second metal panel, said upper gate movable between a raised position away from said lower nest and an engaged position near said lower nest with said lateral access to said material-contacting area being maintained.

21. The machine cell of claim 20, further including means for moving said upper gate relative to said lower nest.

22. The machine cell of claim 20, wherein said upper gate includes at least one contact support shaft.

23. The machine cell of claim 20, wherein said upper gate includes three spaced-apart contact support shafts.

24. The machine cell of claim 23, wherein at least one of said three spaced-apart contact support shafts includes a contact plunger for contacting the second sheet material.

25. The machine cell of claim 24, wherein said contact plunger comprises a housing slidably supporting a spring-loaded nose.

26. The machine cell of claim 24, wherein at least one of said three spaced-apart contact support shafts includes an alignment pin capable of engaging an alignment hole formed in the second metal panel.

27. The machine cell of claim 13, wherein said vacuum system further comprises a plenum and a fluid line connecting said plenum to each of said elongated channels.

28. The machine cell of claim 27, wherein said vacuum system further comprises a vacuum source in fluid communication with said plenum.

29. The machine cell of claim 13, wherein said lower nest further includes an alignment mechanism for aligning the upper sheet material to the lower sheet material.

30. The machine cell of claim 29, wherein said alignment mechanism comprises a pair of crowders, each of said pair of crowders including a pivoting alignment finger.

31. A machine cell for forming a body panel by joining of a first metal panel to a second metal panel by a forming tool, the machine cell comprising:
- a lower nest including a frame having a base and a plurality of sidewalls, each of said plurality of sidewalls extending from said base and terminating at an upper surface defined to substantially conform to a perimeter region of the first metal panel, the upper surface having a generally flat material-contacting area extending to a boundary of the upper surface to enable unobstructed lateral movement of the forming tool from the material-contacting area across the boundary;
- a plurality of pads supported on said base and located adjacent to said plurality of sidewalls, each of said plurality of pads having a sealing surface defined to substantially conform to an interior region of the first metal panel and an elongated cavity formed therein;
- a vacuum system to enable fluid communication between a vacuum source and said elongated cavity for selectively evacuating said elongated cavity;
- wherein said plurality of pads and said vacuum system are operable to generate a downward clamping force sufficient to laterally immobilize the first metal sheet during an operation clinching together the first metal panel and the second metal panel.

32. A method for forming a body panel by joining of a first metal panel to a second metal panel, the method comprising:
- locating a first metal panel on an upper surface of a lower nest such that a perimeter region on a first side of said first metal panel is supported on a generally flat material-contacting area of a frame and an interior region of said first side engages a pad such that a sealed elongated channel is formed between said pad and said first metal panel adjacent a portion of said material-contacting area;
- locating a second metal panel on a second side of said first metal panel opposite said first side;
- evacuating said sealed elongated channel to immobilize said first metal panel on said frame; and
- operating a tool across the boundary of said upper surface to said material-contacting area on said first metal panel to form and flange said first metal panel over an edge of said second metal panel.

33. The method of claim 32 further comprising aligning said first metal panel on said frame prior to evacuating said sealed elongated channel.

34. The method of claim 32 further comprising aligning said second metal panel on said first metal panel prior to operating said tool.

* * * * *